United States Patent

Sakazawa et al.

[11] Patent Number: 6,011,587
[45] Date of Patent: Jan. 4, 2000

[54] PACKET VIDEO BITRATE CONVERSION SYSTEM

[75] Inventors: Shigeyuki Sakazawa; Yasuhiro Takishima, both of Tokyo; Masahiro Wada, Kanagawa, all of Japan

[73] Assignee: Kokusai Denshin Denwa Kabushiki Kaisha, Tokyo, Japan

[21] Appl. No.: 08/801,063

[22] Filed: Feb. 14, 1997

[30] Foreign Application Priority Data

| Mar. 7, 1996 | [JP] | Japan | 8-078172 |
| Jul. 8, 1996 | [JP] | Japan | 8-195207 |
| Jul. 15, 1996 | [JP] | Japan | 8-204282 |

[51] Int. Cl.$^7$ .................................................. H04N 7/12
[52] U.S. Cl. ........................................ 348/387; 348/390
[58] Field of Search ................... 348/415, 405, 348/387, 423, 497, 419, 384, 390, 7, 15, 20; 370/395, 429; H04N 7/12

[56] References Cited

U.S. PATENT DOCUMENTS

| 5,231,633 | 7/1993 | Hluchyj et al. | 370/429 |
| 5,457,495 | 10/1995 | Hartung | 348/15 |
| 5,475,421 | 12/1995 | Palmer et al. | 348/15 |
| 5,541,852 | 7/1996 | Eyuboglu et al. | 348/415 |
| 5,550,581 | 8/1996 | Zhou | 348/20 |
| 5,550,590 | 8/1996 | Sakazawa et al. | 348/387 |
| 5,565,924 | 10/1996 | Haskell et al. | 348/423 |
| 5,572,248 | 11/1996 | Allen et al. | 348/19 |
| 5,691,986 | 11/1997 | Pearlstein | 348/387 |

FOREIGN PATENT DOCUMENTS 4-3684   1/1992   Japan .

OTHER PUBLICATIONS

Proceeding of the 1996 IECE General Conference 2, D–214, by Shigeyuki Sakazawa et al., Mar. 28–31, 1996, pp. 1–2 (partial translation).

Primary Examiner—Tommy P. Chin
Assistant Examiner—Gims Philippe
Attorney, Agent, or Firm—Westman, Champlin & Kelly, P. A.

[57] ABSTRACT

An H. 261 encoder outputs coded video data together with a mode selection signal and a judging signal as to discarding or not of a packet. A packetizer receives the output signal from the H. 261 encoder and separately packetizes motion data and DCT data in the input coded data. A gateway judges whether packet including the DCT data is discarded or not with reference to the packet discarding judging signal and also to the bitrate of the network to which the gateway is connected. The gateway thus can effect bitrate conversion according to the bitrate of the network with a simple construction. The gateway may selectively discard high frequency component packets without discarding low frequency component packets, or it may not discard first importance component packets having greater influence on picture quality and selectively discard second importance component packets having less influence.

3 Claims, 17 Drawing Sheets

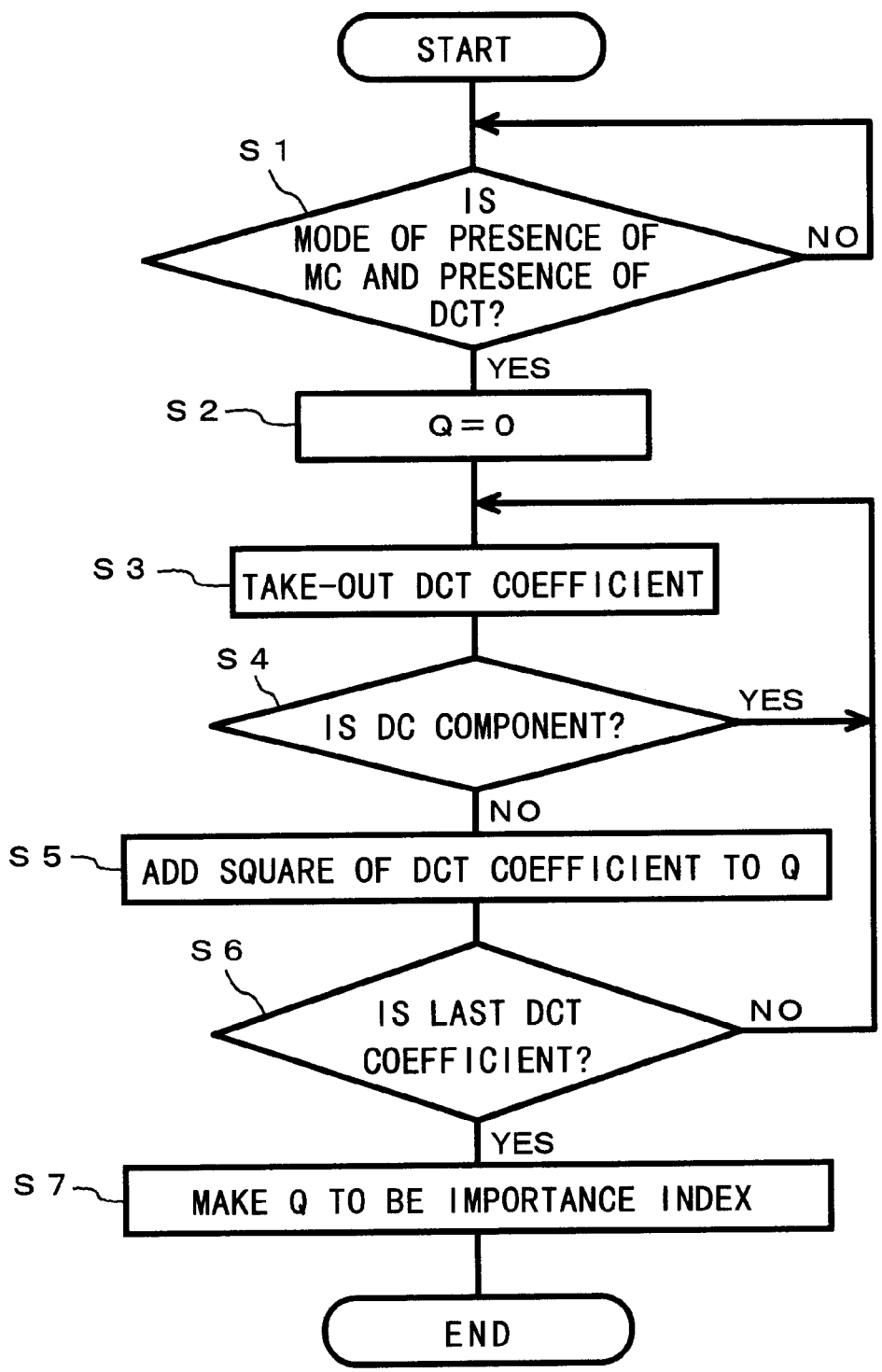

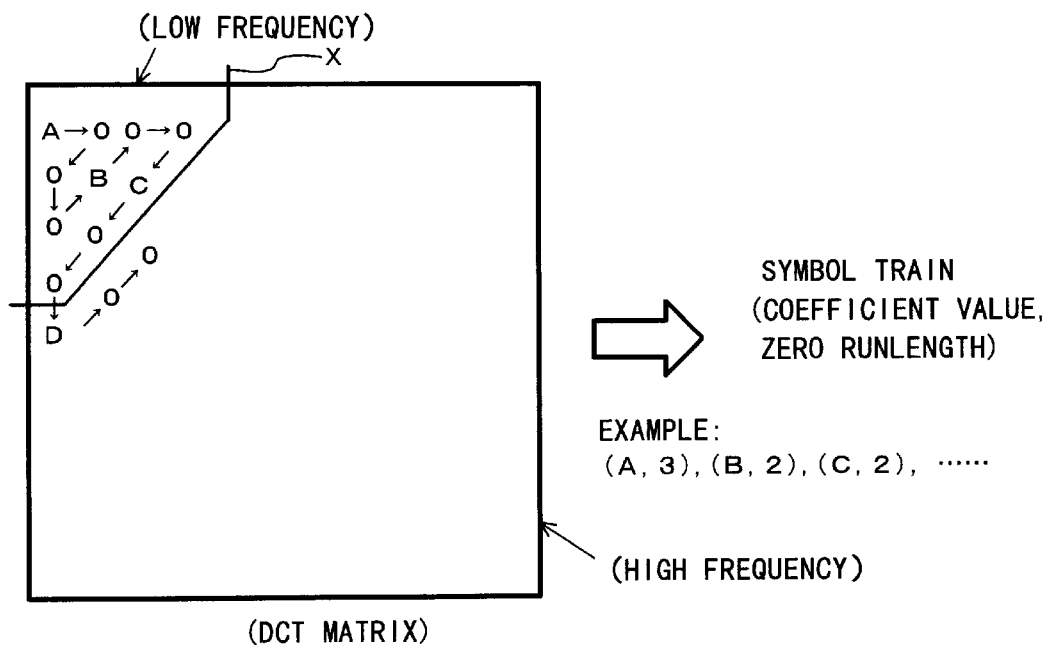
F I G. 1 3
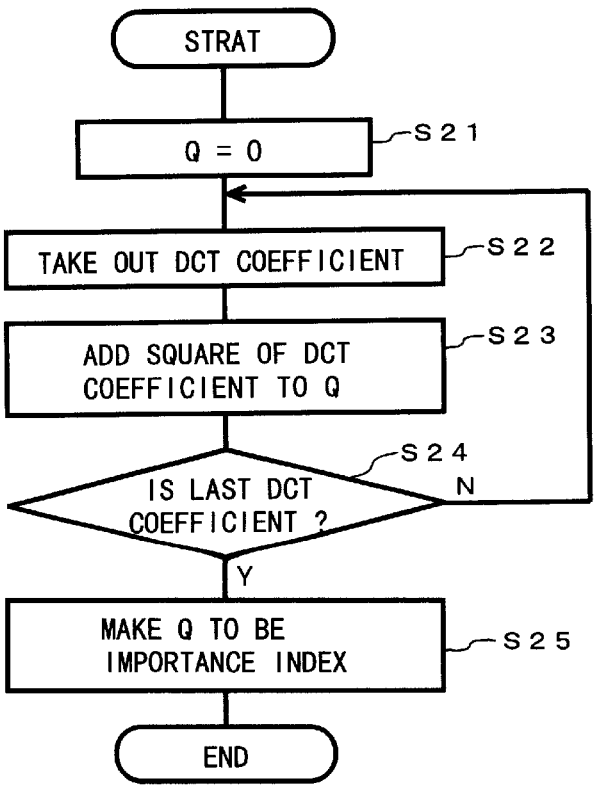
F I G. 1 4

F I G. 16
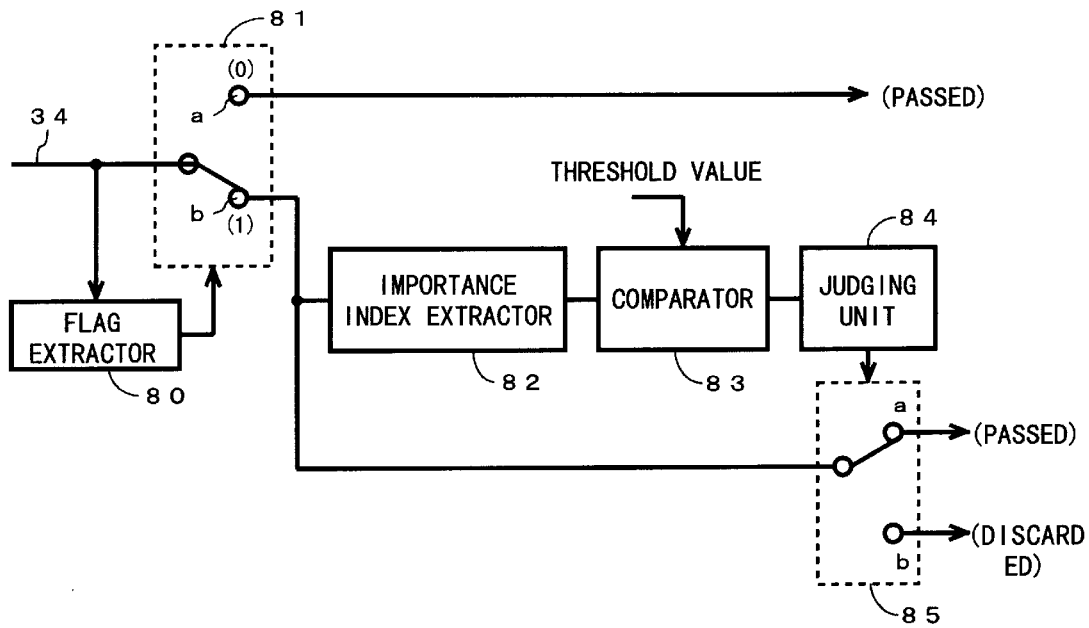
F I G. 17
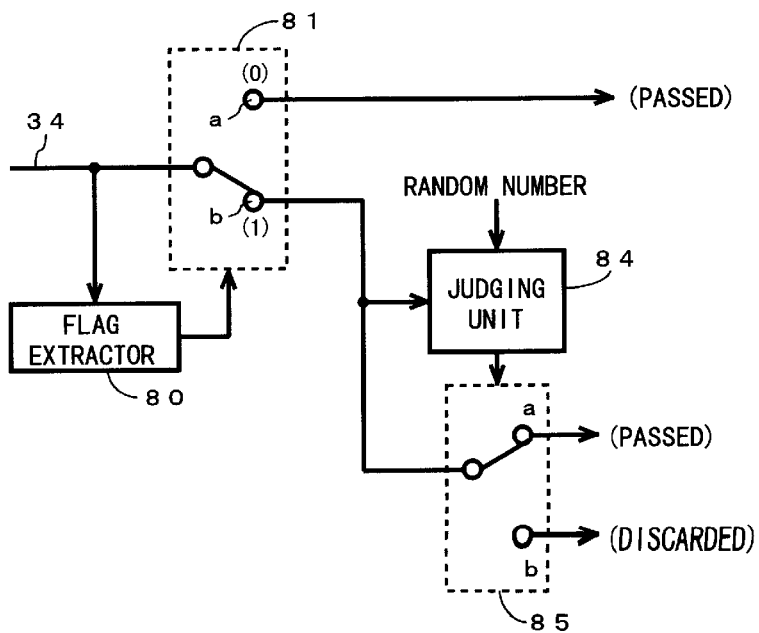

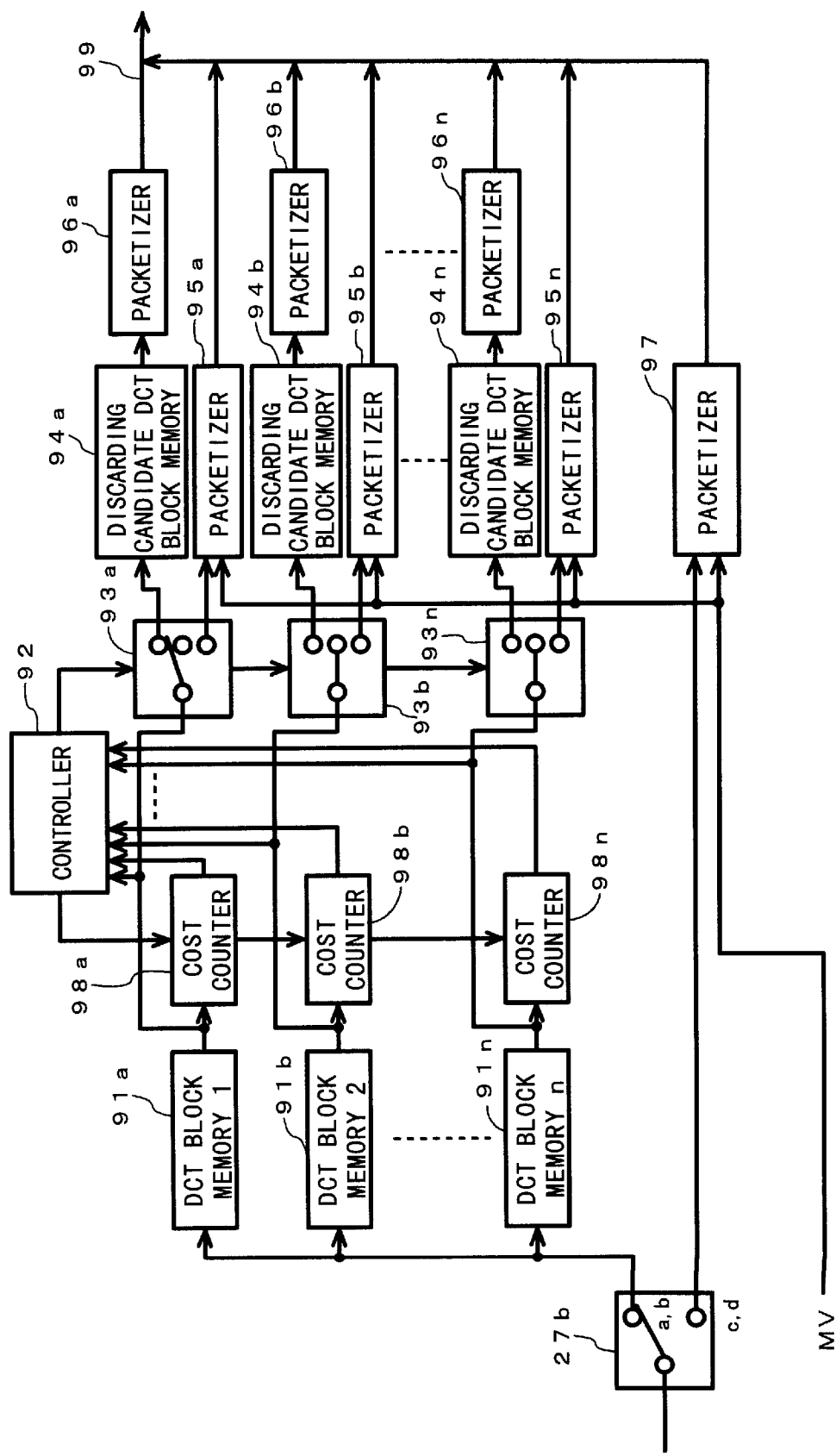

PACKET VIDEO BITRATE CONVERSION SYSTEM

BACKGROUND OF THE INVENTION

1. Field of the Invention

This invention relates to packet video bitrate conversion systems and, more particularly, packet video bitrate conversion systems which are suitably used when video conferences are held in circumstances constituted by various networks and beyond these networks.

2. Description of the Related Art

Heretofore, video conferences are held by interconnecting various networks using gateways or the like. In such a case, the bitrate of the video transmission is limited to the bitrate of the lowest bitrate network. This means that video bitrate converters are necessary to hold video conferences.

A prior art video bitrate converter decodes coded video data and then re-encodes the decoded video data at a desired bitrate. Another prior art video bitrate converter which is disclosed in Japanese Laid-Open Patent Publication No. 4-3684, encodes video data by layered coding into high priority data and low priority data to be transmitted, and deletes the low priority data when the network is congested.

The former prior art video bitrate converter, however, dictates complicated processes as decoding and re-encoding video data to be performed in a gateway, which connects a LAN and a line connecting remote LANs. Inevitably, the gateway has a complicated construction, increasing equipment cost and process delay.

The latter prior art video bitrate converter, has a problem that the bitrate cannot be freely converted in a gateway, because of the fact that the ratio between high and low priority data is fixed when encoding the video data.

SUMMARY OF THE INVENTION

An object of the invention is to provide a packet video bitrate converter, which can overcome the above problems inherent in the prior art and permits bitrate conversion in a gateway having a simple construction.

Another object of the invention is to provide a packet video bitrate converter, which permits sufficient restoration of low frequency DCT (discrete cosine transform) coefficients, which is important from the standpoint of the subjective picture quality improvement.

To attain the above objects of the invention, the invention features a packet video bitrate conversion system for packetizing video data and executing bitrate conversion by using the packetized data, the packet video bitrate conversion system comprising encoding means for encoding video data and outputting coded data including mode selection data, packetizing means for packetizing coded data from the encoding means, and bitrate conversion means for effecting bitrate conversion by selectively discarding the packetized data.

The invention also features a decoder for receiving and encoding packetized coded data, the decoder comprising means for extrapolating missing packet data with preceding frame data when the missing packet data is received.

According to the invention, packetized data obtained from coded video data is selectively discarded in transmission, and it is possible to change the bitrate of transmission. In addition, on the receiving side upon reception of the discarded packetized data, missing packet data is extrapolated with preceding frame data, and it is possible to reproduce video data without substantially spoiling the picture quality.

The invention further features a packet video bitrate conversion system for packetizing video data and executing bitrate conversion by using the packetized data, the packet video bitrate conversion system comprising encoding means for encoding video data and outputting coded data including mode selection data, separating means for separating low frequency and high frequency DCT components in coded data, means for independently packetizing the separated DCT components from the separating means, and bitrate conversion means for effecting bitrate conversion by selectively discarding high frequency DCT component packets.

According to the invention, only high frequency DCT components are selectively discarded, and low frequency DCT components which are important in maintaining the subjective picture quality are not discarded. It is thus possible to readily execute packet video bitrate conversion and prevent picture quality deterioration as much as possible.

The invention further features a packet video bitrate conversion system for packetizing video data and executing bitrate conversion by using the packetized data, the packet video bitrate conversion system for packetizing video data and executing bitrate conversion by using the packetized data, the packet video bitrate conversion system comprising encoding means encoding video data and outputting coded data including Mode selection data, separating means for relatedly separating, for each DCT block, first importance and second importance DCT components more and less influencing the picture quality of each DCT block, in DCT-component- including coded data, means for independently packetizing the separated DCT components from the separating means, and bitrate conversion means by selectively discarding second importance DCT component packets.

According to the invention the second importance DCT components to be selectively discarded are obtained by relating together the second importance DCT components in individual DCT blocks, and it is thus possible to obtain a substantially fixed picture quality of video data after the bitrate conversion over the entire frame.

BRIEF DESCRIPTION OF THE DRAWINGS

FIG. 5 is a flow chart illustrating an importance index deriving routine;

FIG. 13 is a view illustrating zig-zag scanning of a DCT matrix to obtain a symbol train;

FIG. 14 is a flow chart illustrating an importance index deriving routine;

FIG. 16 is a block diagram showing an example of the bitrate converter in the gateway;

FIG. 17 is a block diagram showing a different example of the bitrate converter in the gateway;

FIG. 21 is a block diagram showing a divider in a fourth embodiment of the invention;

DETAILED DESCRIPTION OF THE PREFERRED EMBODIMENTS

Figure 1:
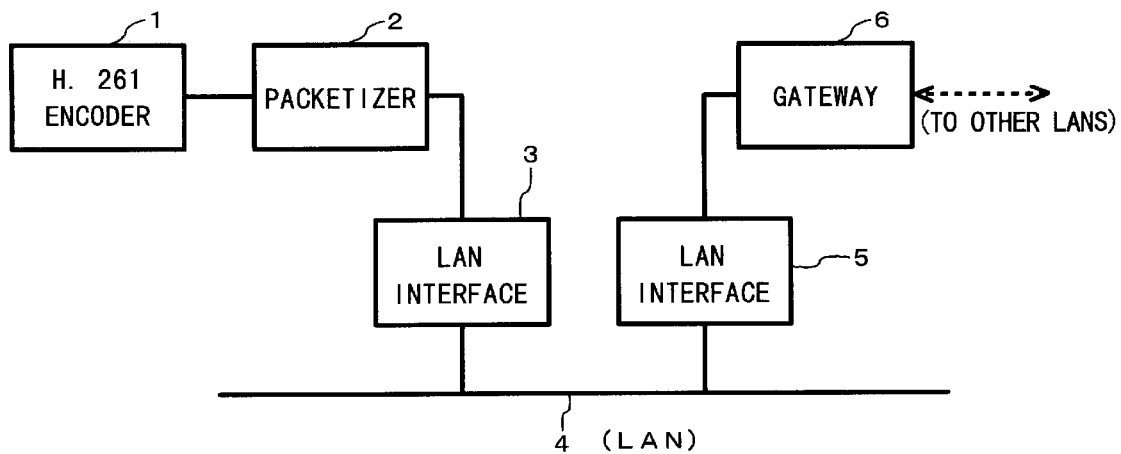
FIG. 1 is a block diagram outlining a system construction to which the invention is applied.

The invention will now be described with reference to the drawings. FIG. 1 is a block diagram showing a system construction using a LAN for video conferences. An H. 261 video encoder 1 utilizes International Standards H. 261 for video conferences combining MC (motion compensation) and DCT (discrete cosine transform) encoding. A packetizer 2 packetizes the output signal of the H. 261 video encoder. As will be described later in detail, the H. 261 video encoder 1 provides macroblock header, motion data and DCT data with one macroblock. The packetizer 2 outputs the macroblock header and motion data as a packet and the DCT data as another packet. The packetized video data is sent out through an LAN interface 3 to an LAN 4 and also thence through another LAN interface 5 to a gateway 6. The gateway 6 is provided for connecting the system to other LANs, and it outputs the packetized video data by making bitrate conversion.

A construction of the H. 261 video encoder 1 embodying the invention will now be described with reference to FIG. 2. The International Standards H. 261 for video conferences prescribe division of the screen into units called macroblocks each consisting of 16 by 16 pixels for the MC and the DCT encoding. Video data 11 inputs in units of 16 by 16 pixels to the H. 261 video encoder 1. The H. 261 video encoder 1 includes a first adder 12, a first switch 13, a DCT circuit 14, a quantizer 15, an inverse quantizer 16, an inverse DCT circuit 17, a second adder 18, a second switch 19, a third switch 20, a frame memory 21, a fourth switch 22, a motion compensator 23, a fifth switch 24, an in-loop filter 25, an estimated motion vector generator 26, a sixth switch 27, and a zig-zag scanner 28. The estimated motion vector generator 26 provides an estimated motion vector output MV, which is supplied along with the output of the sixth switch 27 and the output of a DCT high frequency energy calculator 31 to a packetizer 32.

Figure 3:
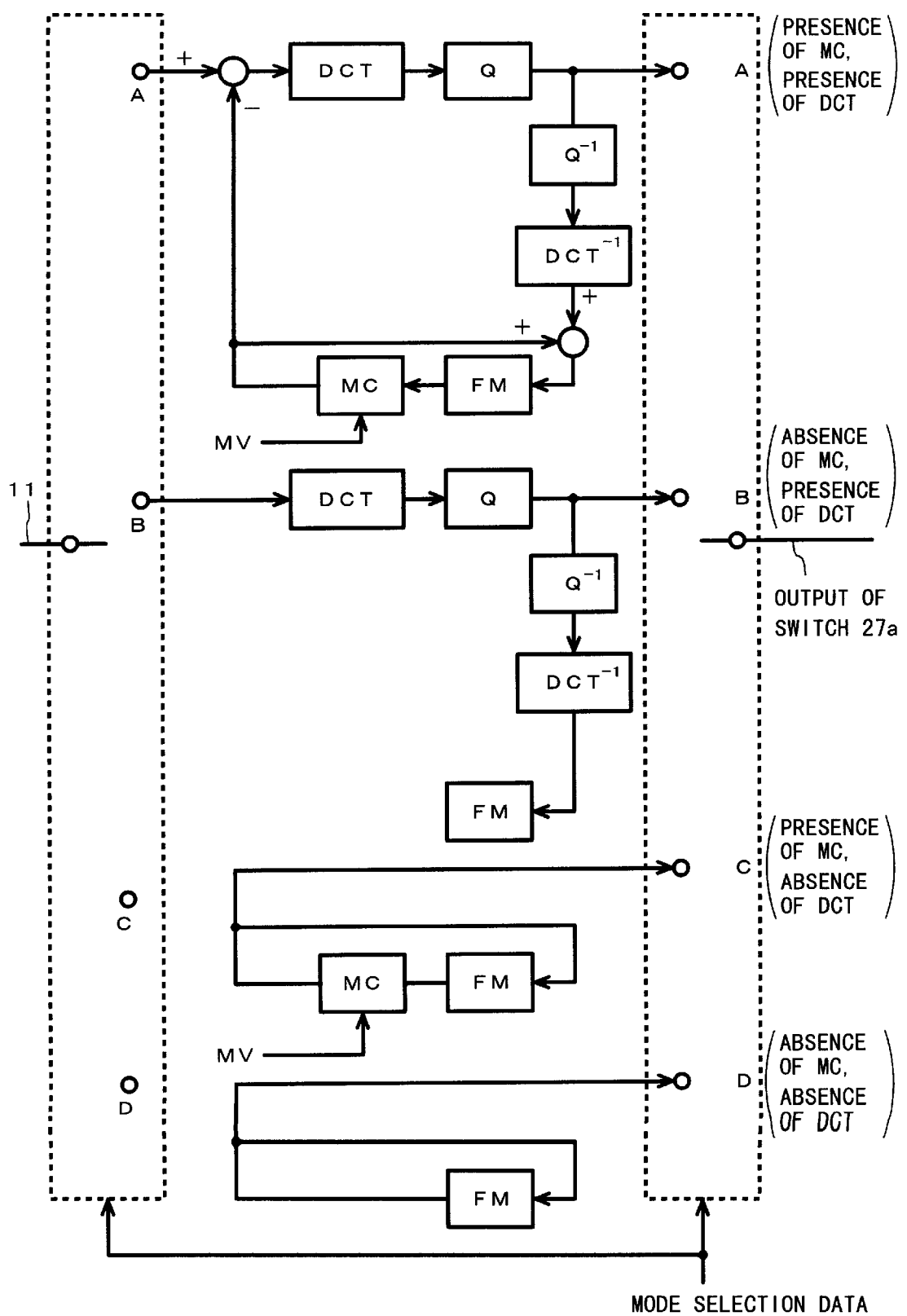
FIG. 3 is a block diagram for describing the operation of the H. 261 encoder.

The operation of the H. 261 video encoder 1 will now be described with reference to FIG. 3. When the first to sixth switches select a terminal a, an encoded output A, in FIG. 3, is obtained, which represents presence of MC (motion compensation) and presence of DCT (discrete cosine transform). When the switches select a terminal b, an encoded output B representing absence of MC and presence of DCT is obtained. When the switches select a terminal c, an encoded output C representing presence of MC and absence of DCT is obtained. When the switches select a terminal d, an encoded output D representing absence of MC and absence of DCT is obtained.

The H. 261 video encoder 1 encodes each macroblock data in one of the above four encoding systems, and selects an encoding system, in which the amount of data involved in the encoding is least. When the pertinent macroblock data has not been change through comparison of the preceding and present video data frames, the amount of encoding data is least in the case of absence of MC and absence of DCT, and accordingly the terminal d is selected by the switches. When the pertinent macroblock data in the present frame is data that has been in a different macroblock in the preceding frame, the mount of encoding data is least in the case of presence of MC and absence of DCT, so that the terminal c is selected.

When the pertinent macroblock data in the preceding frame or similar data is not present in the present frame, that is, when macroblock data not having been present in the preceding frame appears for the first time in the present frame, the mount of encoding data is least in the case of absence of MC and presence of DCT, so that the terminal b is selected. When the pertinent macroblock data in the present frame is produced as a result of a motion from data that has been in a different macroblock in the preceding frame, the encoding is least in the case of presence of MC and presence of DCT, so that the terminal d is selected. The above switches are selected by a mode selection data.

The construction of the H. 261 video encoder 1 as well as the operation thereof as described above, is well known in the art, and not described in greater details.

Figure 4A:
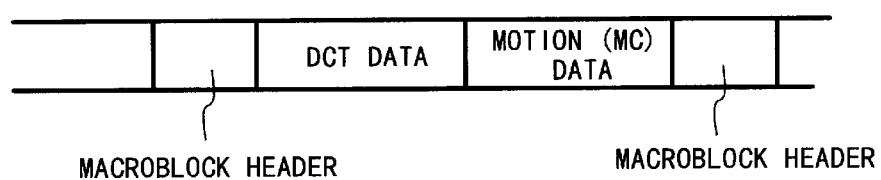
FIG. 4A is a view showing the format of the output signal of the H. 261 encoder.

FIG. 4A shows the output signal of the H. 261, i.e., the output signal of the sixth switch 27. The signal comprises a macroblock header, motion (MC) data and DCT data. The macroblock header contains the mode selection data noted above.

Figure 2:
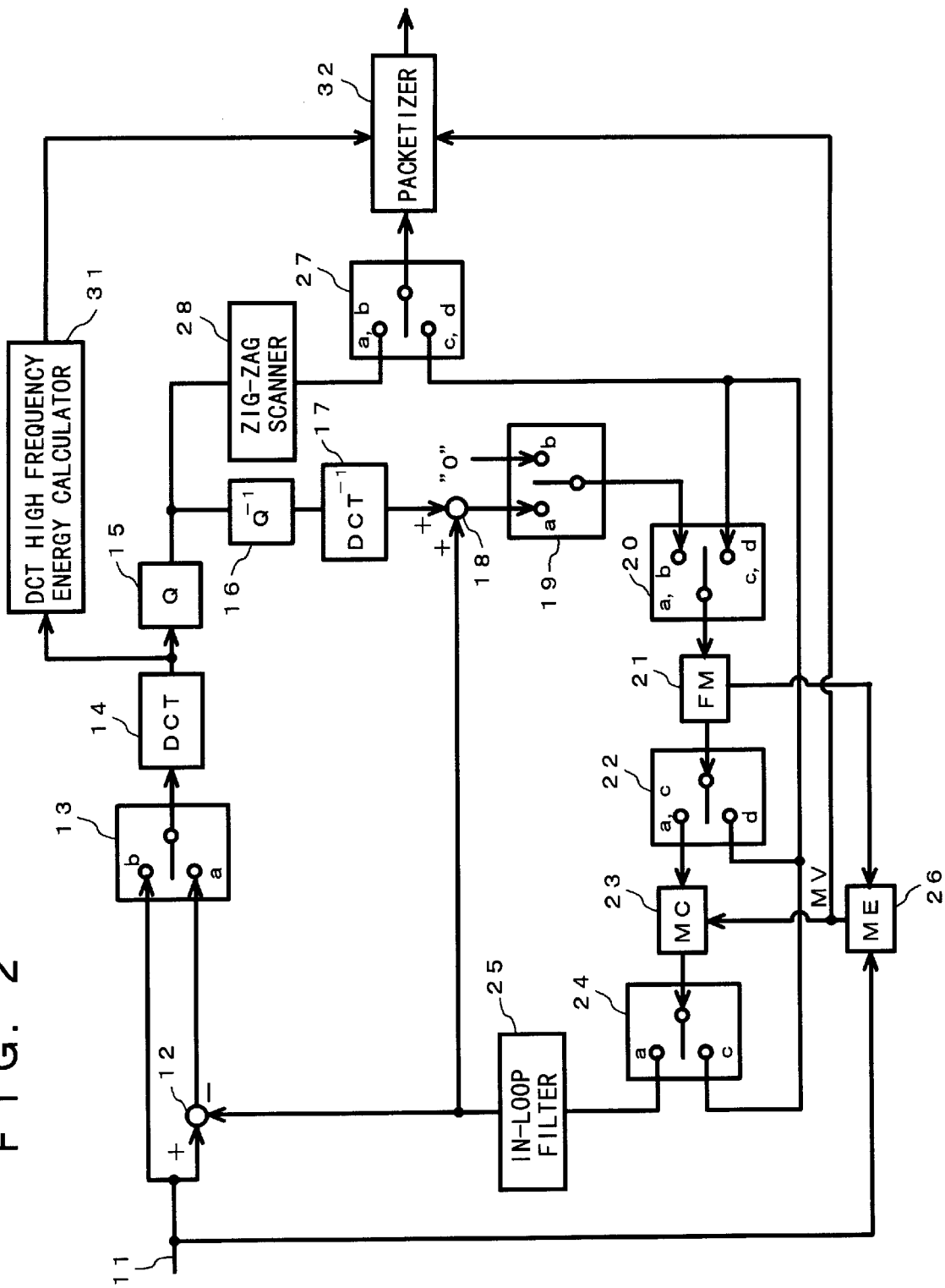
FIG. 2 is a block diagram showing an embodiment of the invention applied to an H. 261 encoder.

The DCT high frequency energy calculator 31 shown in FIG. 2 calculates the energy of the DCT AC component in the case of both presence of MC and DCT. Specifically, the DCT high frequency energy calculator 31 calculates an importance index. FIG. 5 is a flow chart for describing the importance index calculation routine.

In a step S1, a check is made as to whether the mode selection data represents a mode of presence of MC and presence of DCT. When this check step provides "YES", a registered number Q is cleared in a step S2. In a step S3, a DCT coefficient obtained in the DCT circuit 14 is inputted. In a step S4, a check is made as to whether the DCT coefficient is a DC component. When this check step provides "YES", the routine goes back to the step S32, in which the next DCT coefficient is inputted. When the check step S4 provides "NO", that is, when the inputted DCT coefficient is determined to be an AC component, a step S5 is executed, in which square of the DCT coefficient is added to the number Q. In a step S6, a check is made as to whether the squared DCT coefficient has been the last one. When this check step provides "NO", the routine goes back to the step S3 again for the input of the next DCT coefficient. In this way, squares of successive DCT coefficients are accumulated. When the check step S6 provides "YES", the number thus obtained is made to be the importance index. This importance index is provided to the packetizer 32.

Figure 6:
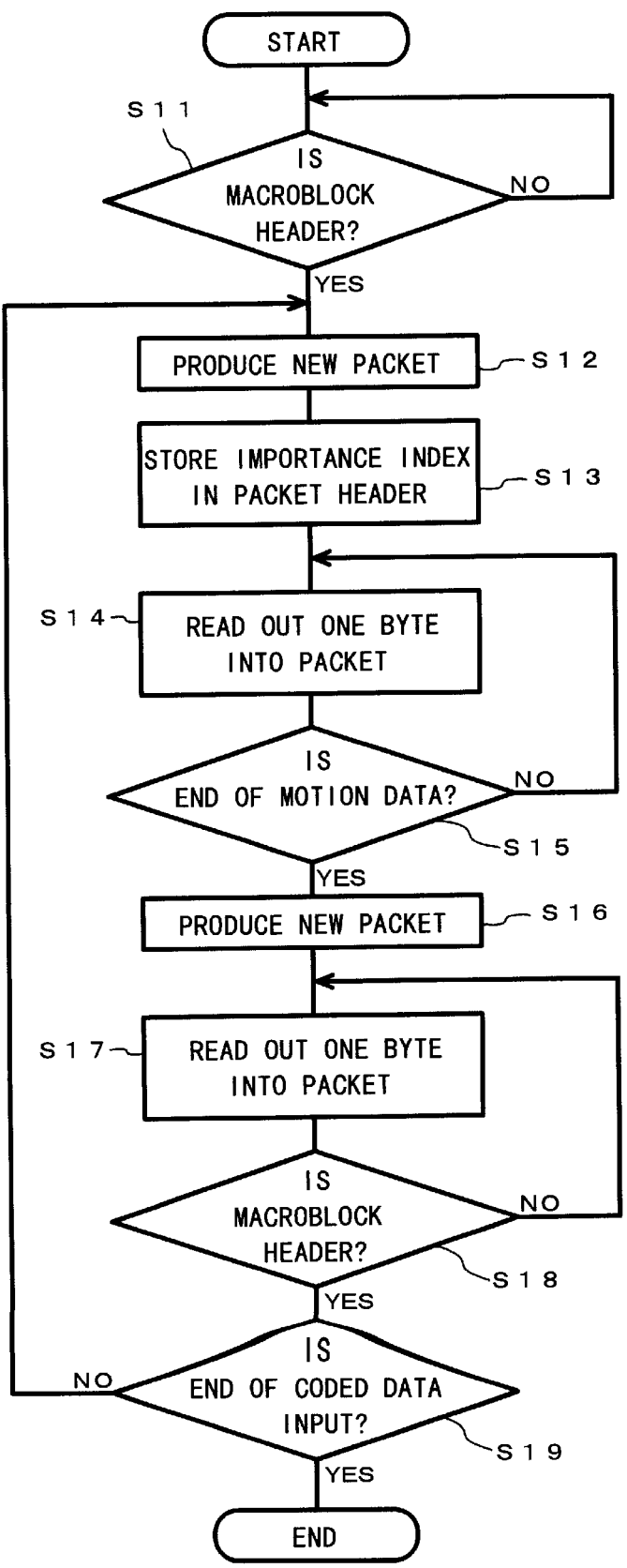
FIG. 6 is a flow chart illustrating a packetizing routine.

FIG. 6 illustrates the operation of the packetizer 32. In step S11, a check is made as to whether a macroblock header has been inputted. When this check step provides "YES", a new packet is produced in a step S12. In a step S13, the importance index is stored in the macroblock header of the new packet. In a step S14, one byte is read out from the macroblock header and stored in the packet. In a step S15, a check is made as to whether the all motion data has been packetized. When this check step provides "NO", the routine goes back to the step S14, in which the next byte is read out and stored in the packet. The step S15 thus provides "YES" when the macroblock header and the motion data have been stored in one packet.

Figure 7:
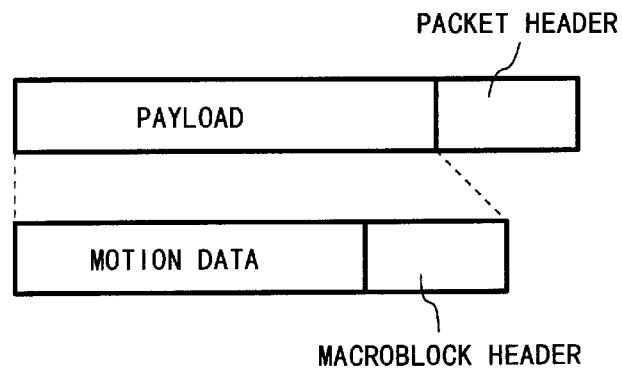
FIG. 7 is a view showing an example of the packet format.

FIG. 7 shows an example of the format of the packet that is produced in the above routine. The packet comprises a packet header and a payload. The packet header includes the importance index. The payload comprises the macroblock header and motion data. The macroblock header includes H. 261 mode selection data.

Figure 4B:
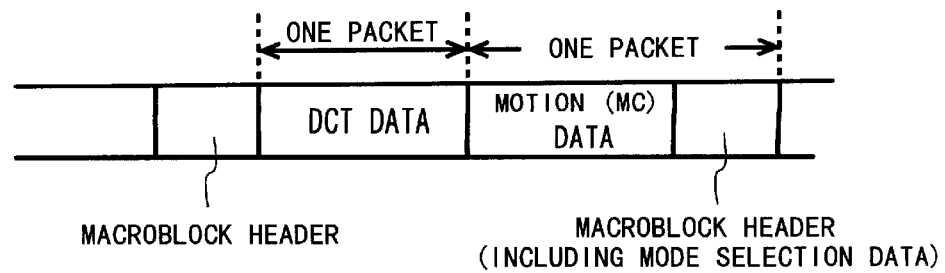
FIG. 4B is a view showing the format of the output signal of a packetizer.
Figure 8:
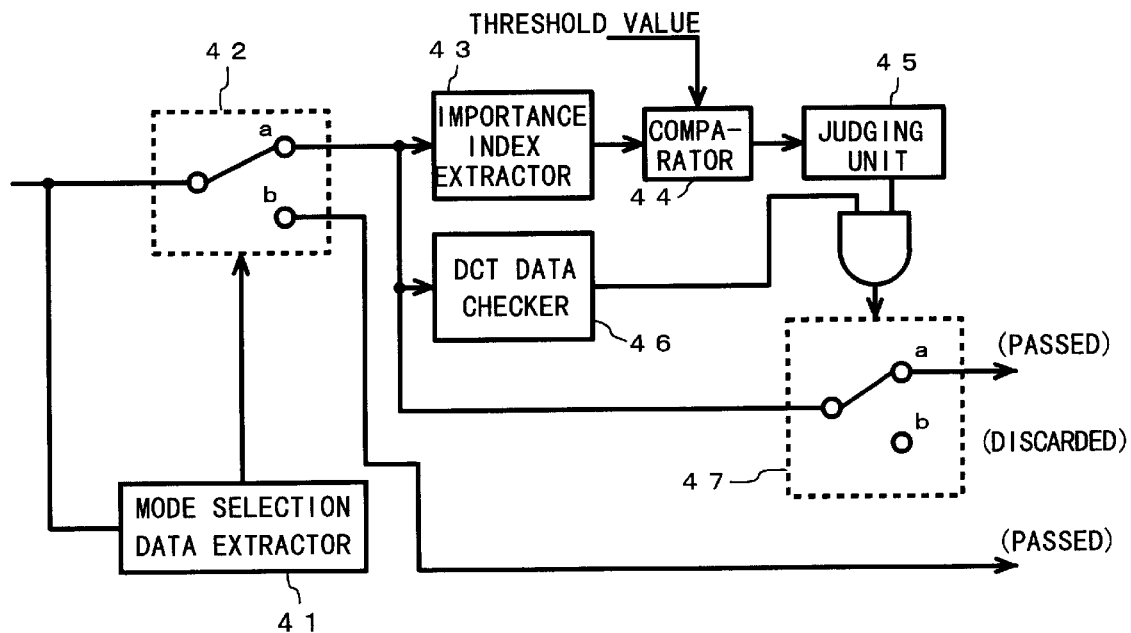
FIG. 8 is a block diagram showing an example of the bitrate converter in the gateway.

Subsequent to the step S16 in FIG. 6, in which the new packet is produced, one byte of the DCT data is read out and stored in the packet in a step S17. In a step S18, a check is made as to whether a macroblock header has been inputted. When this check step provides "NO", the routine goes back to the step S17, in which the next byte is stored in the packet. The step S18 thus provides "YES" when the DCT data has been stored in one packet. In the above routine, one packet is produced by the macroblock header and motion data, while another packet is produced by the DCT data, as shown in FIG. 4B. The data outputted from the packetizer 2 is inputted through the LAN interface 3, LAN 4 and LAN interface 5 to the gateway 6. FIG. 8 is a block diagram showing an example of the construction of the gateway 6. As shown, the gateway 6 comprises a mode selection data extractor 41 for extracting mode selection data from received packet data, a switch 42 which selects a terminal a when the mode of presence of MC and presence of DCT is represented while otherwise selecting a terminal b, an importance index extractor 43 for extracting the importance index from the packet header, a comparator 44 for comparing a predetermined threshold value and the importance index, a judging unit 45 for determining that the DCT data is to be passed or discarded, a DCT data checker 46, and as switch 47 for controlling the passing and discarding of the DCT data.

The operation of this gateway 6 will now be described. When packetized data is inputted from the packetizer 2, the mode selection data extractor 41 extracts the mode selection data and controls the operation of the switch 42 according to the extracted mode selection data. The switch 42 selects the terminal a in the mode of presence of MC and presence of DCT, while selecting the terminal b in any other mode. In a mode other than the mode of presence of MC and presence of DCT, the packetized data is passed through the gateway.

The importance index extractor 42 extracts the importance index from the inputted packet and feeds it to the comparator 44. The comparator 44 compares this importance index with the predetermined threshold value. When the importance index is not less than the threshold value, the comparator 45 outputs a control signal commanding the selection of the terminal a of the switch 47. The DCT data checker 46 checks whether the packet being inputted is DCT data. When and only when the DCT data checker 46 determines that DCT data is being received and the judging unit 45 determines that the importance index is less than the threshold value, the switch 47 selects its terminal b, while selecting the terminal a. In other words, when the importance index is less than the threshold value, the DCT data is discarded.

In the above embodiment, the gateway extracts the importance index from each received packet and determines whether the DCT data is to be passed or not in dependence on whether the importance index is above a threshold value. It is thus possible to realize bitrate conversion with a gateway of a simple construction.

In the above embodiment, DCT packets of less DCT high frequency energy levels are discarded. However, this is by no means limitative; for instance, it is possible to permit discarding of DCT packets of less absolute values of motion vector (or motion data), or permit discarding of DCT packets of less absolute values of the difference between the motion vectors of the preceding and present macroblocks.

Figure 9:
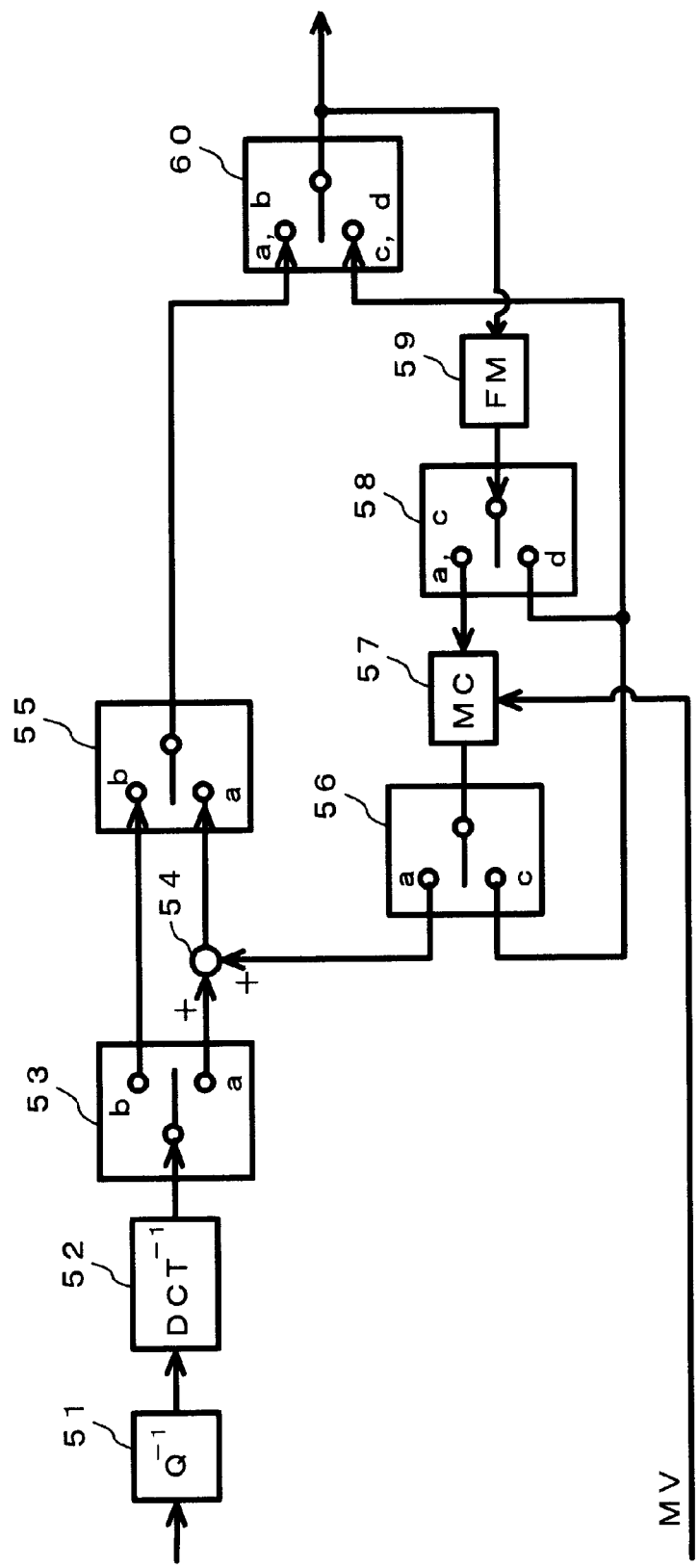
FIG. 9 is a block diagram showing an example of decoder.

FIG. 9 is a block diagram showing an example of decoder according to the invention. As shown, the decoder comprises an inverse quantizer 51, an inverse DCT circuit 52, a first switch 53, an adder 54, a second switch 55, a third switch 56, a motion compensator 57, a fourth switch 58, a frame memory 59, and a fifth switch 60. The first to fifth switches select terminals a to d in the manner as described before in connection with the case of FIG. 2. Specifically, the terminal a is selected in the mode of presence of MC and presence of DCT, the terminal b is selected in the mode of absence of MC and presence of DCT, the terminal c is selected in the mode of presence of MC and absence of DCT, and the terminal d is selected in the mode of absence of MT and absence of DCT.

The operation of the decoder when DCT data is discarded in the gateway 6 noted above is as follows. In this case, the terminal a is selected by the first to fifth switches because of the mode of presence of MC and presence of DCT. Decoded data of the preceding frame has been stored in the frame memory 59. The motion compensator 57 executes motion compensation by applying motion vector to the decoded data of the preceding frame. The compensated data is inputted in the adder 54. Data input to the decoder includes partly missing DCT coded data. In this example of decoder, the preceding frame data indicated by motion vector MV can be motion corrected for use, and it is thus possible to substantially make up for the missing DCT coded data.

Figure 10:
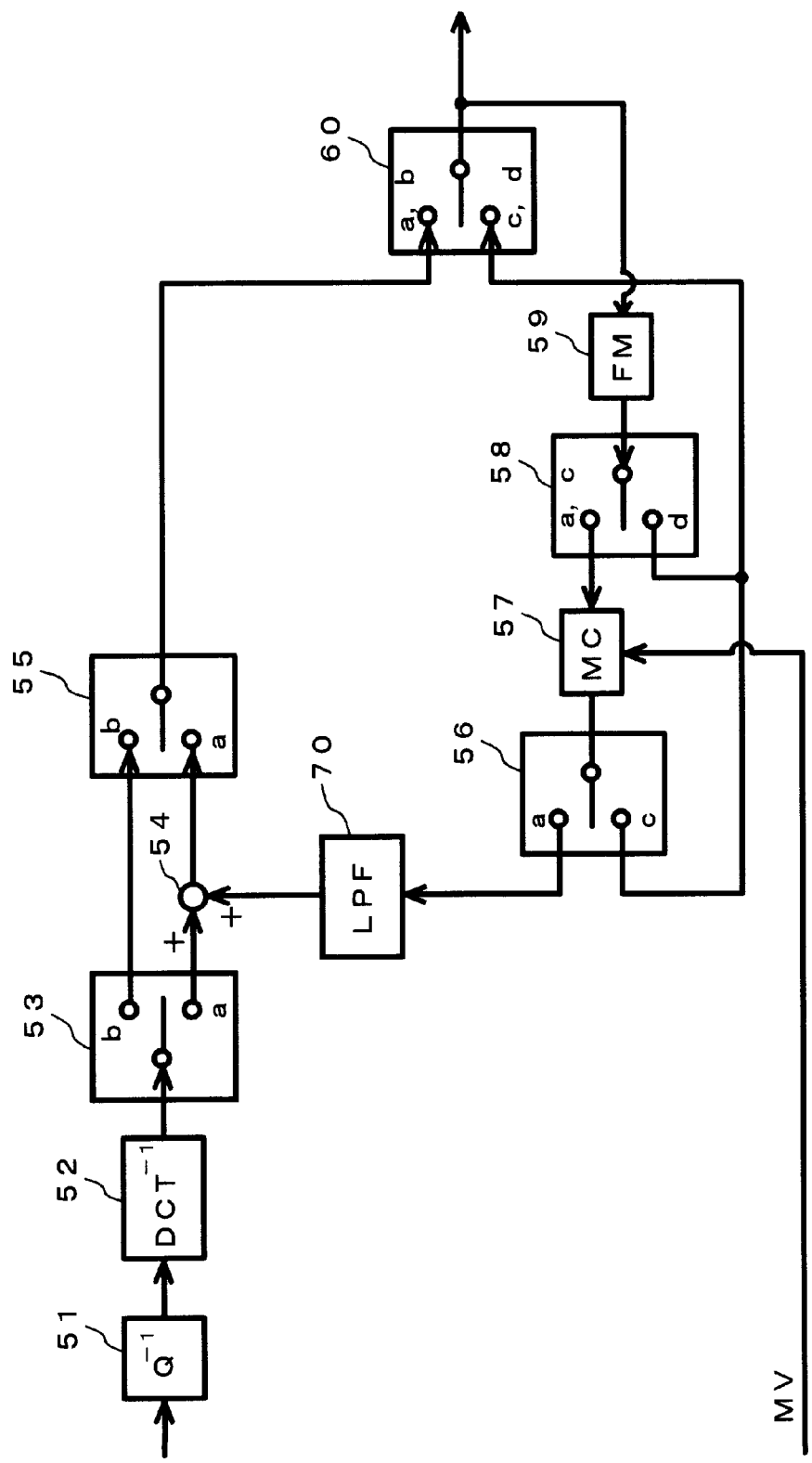
FIG. 10 is a block showing a different example of the decoder.

FIG. 10 shows a different example of the decoder according to the invention. This example is the same as the preceding example shown in FIG. 9 except for that a low-pass filter 70 is provided between the third switch 56 and the adder 54. In FIG. 10, reference numerals like those in FIG. 9 designate like or equivalent parts. The low-pass filter 70 can suppress high frequency components of image, thus making image distortion due to missing image portions less noticeable.

Figure 11:
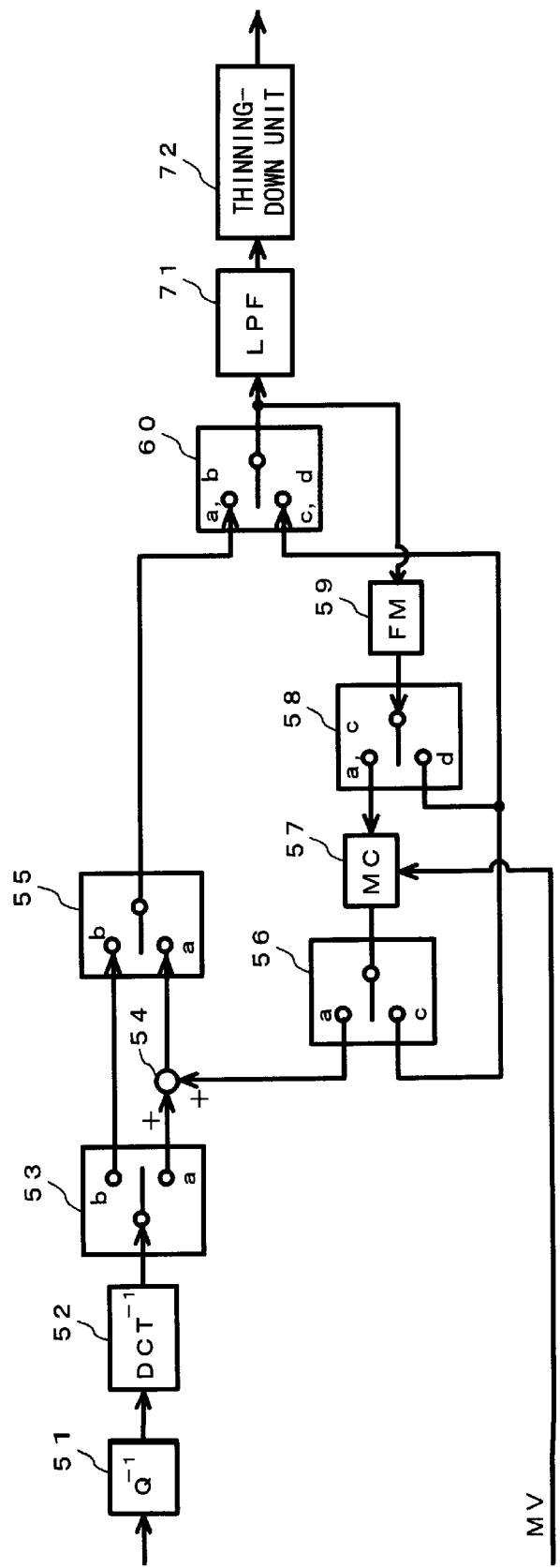
FIG. 11 is a block diagram showing a further example of the decoder.

FIG. 11 is a block diagram showing a further example of the decoder according to the invention. This example is the same as the example shown in FIG. 9 except for that a low-pass filter 71 and a thinning-down unit 72 are provided after the fifth switch 60. In FIG. 11, reference numerals like those in FIG. 9 designate like parts. In this example, the decoded image can be subjected to a low-pass filtering process and a thinning-down process, thus permitting suppression of high frequency components of image and image size reduction. Image distortion due to missing image portions thus can be made less noticeable.

According to the invention, packetized data to be transmitted is selectively discarded in the gateway, thus permitting simple bitrate conversion in data communication. In addition, the importance index or like data for judging whether or not to discard a video packed is added to the same, permitting simple judgment as to whether or not to discard the video packet. Bitrate conversion thus can be realized with a simple arrangement. Furthermore, sole DCT data is discarded while preserving motion data, and it is thus possible to avoid picture quality deterioration as much as possible. Also, when a missing data packet is received in the decoder, it is extrapolated using preceding frame data, permitting avoiding of picture quality deterioration as much as possible.

In the above embodiment of the invention, when the mode of encoding a local block (i.e., macroblock) of image is the mode of presence of MC and presence of DCT and the DCT high frequency energy level is low, the DCT packet is discarded, and in decoding the discarded DCT packet is extrapolated with picture elements from the processing frame. This technique takes sufficient restoration of low frequency coefficients of the discarded DCT into no considerations.

A second embodiment of the invention will now be described with reference to FIG. 12. This embodiment is the same as the construction shown in FIG. 2 except for that it further comprises a separator 28 for separating low frequency and high frequency DCT components video data of 8 x 8 picture elements outputted from the sixth switch 27a, 27b, a controller 29 for controlling the operation of the separator 28, packetizers 30 and 32 for packetizing inputted low frequency and high frequency DCT components, respectively, a DCT high frequency energy calculator 31 for calculating high frequency energy of DCT, and a packetizer 33 for packetizing motion compensation (MC) data.

Figure 12:
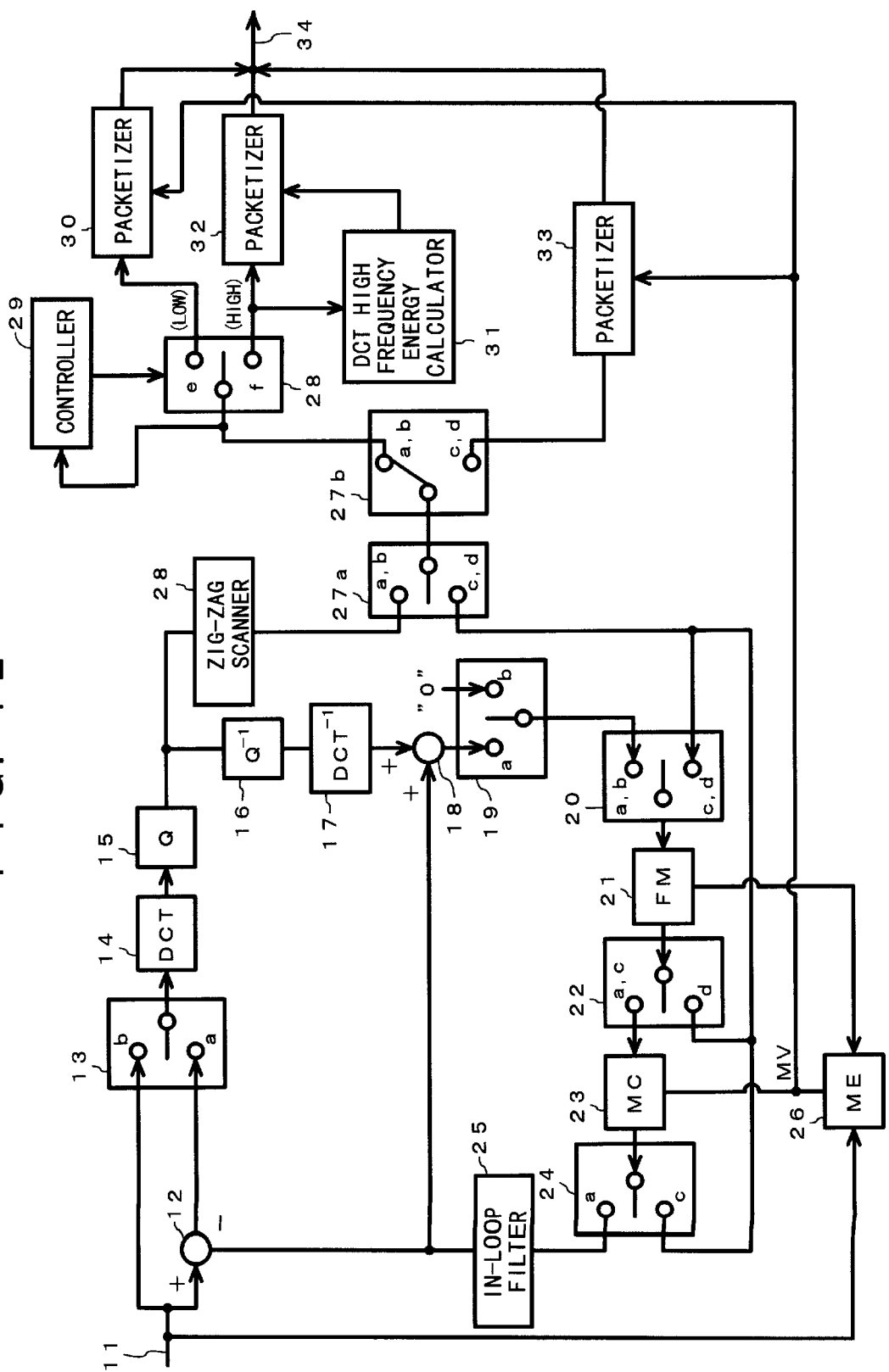
FIG. 12 is a block diagram showing a second embodiment of the invention.

FIG. 13 is a view for describing the operation of the controller 29 shown in FIG. 12. As shown in the figure, DCT components outputted from the switch 27a, 27b constitute s symbol train, i.e., a train of coefficient values and zero runlengths, which is obtained as a result of zig-zag scanning of a DCT matrix. When A, B, C, D, . . . as shown are coefficient values other than zero, the signal output of the sixth switch 27a is given as "(A, 3), (B, 2), (C, 2), . . . ". The controller 29 counts coefficients appearing in the symbol train provided through the zig-zag scanning, and it can control the operation of the separator 26 by comparing the count with a predetermined reference value. With a reference value of "10", the controller 29 can separate low frequency and high frequency components with respect to a section line X shown in FIG. 13. The reference value can be selected as desired.

The operation of the DCT high frequency energy calculator 31 will be described with reference to the flow chart of FIG. 14. In a step S21, a registered number Q is cleared. In a step S22, a DCT coefficient is taken out. In a step S23, the square of the taken-out DCT coefficient is added to Q. In a step S24, a check is made as to whether the prevailing DCT coefficient is the last one. When this check step provides "NO", the routine goes back to the step S22 of taking out a next DCT coefficient. In this way, squares of successive high frequency coefficients of DCT are accumulated. When the step S24 provides "YES", the number Q is certified as the importance index in a step S25. The importance index is supplied to the packetizer 32.

Figure 15:
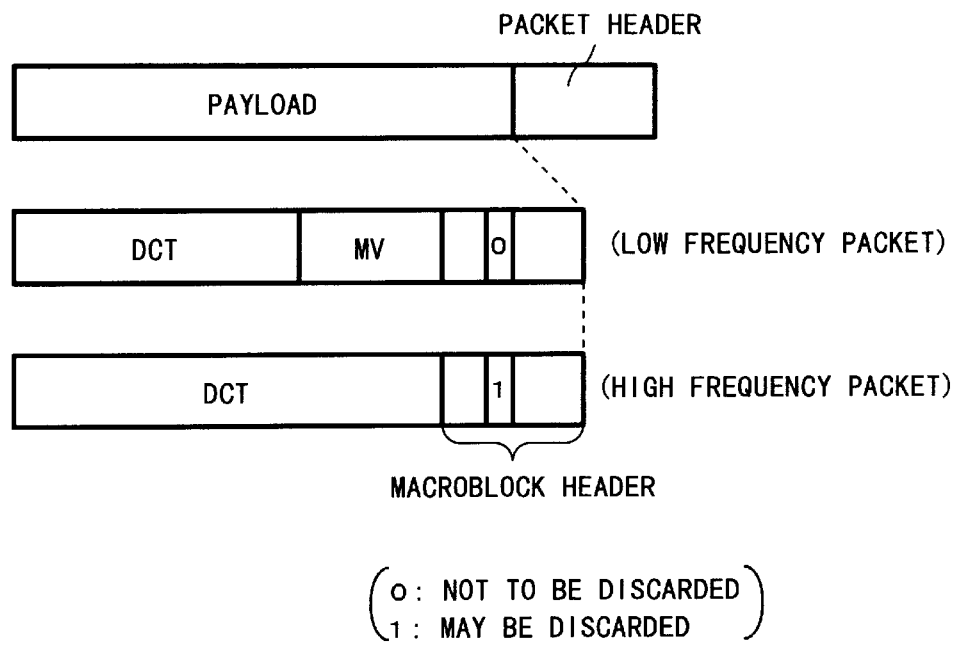
FIG. 15 is a view showing an example of the packet format.

FIG. 15 shows a format example of packets outputted from the packetizers 30 and 32. A packet comprises a packet header and a payload. The payload comprises as macroblock header and a data part. The packetizer 30 generates low frequency packets, which each comprises a macroblock header, motion vector (MV) data and DCT. The packetizer 32 generates high frequency packets, which each comprises a macroblock header and DCT. The macroblock header of the low frequency packet includes a flag of "0", for instance, indicating that this packet is not to be discarded. The macroblock header of a packet generated by the packetizer 33 also includes a flag of "0" indicating that this packet is not to be discarded. The macroblock header of a high frequency packet which is generated by the packetizer 32, on the other hand, includes a flag of "1", for instance, indicating that this packet may be discarded. The importance index generated in the DCT high frequency energy calculator 31 is stored in the packet header of the high frequency packet.

Data generated from the packetizers 30, 32 and 33 is inputted through the LAN interface 3, LAN 4 and LAN interface 5 to the gateway 6 shown in FIG. 1. FIG. 16 is a block diagram showing an example of the construction of the gateway 6 in this embodiment.

As shown, the gateway 6 comprises a flag extractor 80 for extracting the flag in the macroblock header of the packet, a switch 81 which has terminals thereof switched according to the flag extracted by the flag extractor 80, an importance index extractor 82 for extracting the importance index from a high frequency packet, a comparator 83 for comparing the importance index extracted from the importance index extractor 82 with a predetermined threshold value, and a judging unit 84 for generating a control signal for controlling a switch 85 according to the result of comparison in the comparator 83. When the importance index is less than the threshold value, the judging unit 84 outputs a control signal for switching the switch 85 to the side of terminal b.

FIG. 17 is a block diagram showing a different example of the gateway 6. This example features that a judging unit 84 is operated according to a random number. When the random number is less than a predetermined value, the judging unit 84 outputs a control signal for switching the switch 85 to the side of the terminal b. In FIG. 17, reference numerals like those in FIG. 16 designate like or equivalent parts.

The gateway operation will now be described with reference to FIG. 16. Upon inputting of packetized data 34 to the packetizer 30, 32 or 33, the flag extractor 80 extracts the flag in the macroblock header of the packet, and controls the operation of the switch 81 according to the extracted flag. When the extracted flag is "0", the switch 81 selects the terminal a while when "1", the terminal b. When the flag is "0", the packetized data is passed through the gateway without any condition. When the flag is "1", the data 34 is supplied to the importance index extractor 82 and also to the switch 85. The importance index extractor 82 extracts the importance index from the inputted packet and sends it to the comparator 83. The comparator 83 compares the importance index and the predetermined threshold value. When the importance index is not less than the threshold value, the judging unit 84 outputs a control signal for selecting the terminal a of the switch 85. Thus, when and only when the judging unit 84 determines that the importance index is less than the threshold value, the switch 85 selects the terminal b, and otherwise it selects the terminal a. In other words, when the importance index is less than the threshold value, the packet is discarded.

As shown above, in this embodiment the gateway extracts the importance index from the received packet for making a choice as to whether the packet is to be passed or discarded in dependence on whether the importance index has a value greater than the threshold value. Bitrate conversion thus can be realized with a simple gateway construction. In the gateway shown in FIG. 17, the choice as to whether the packet is to be passed or discarded is made in dependence on a random number. Thus, like the case of FIG. 16, it is possible to realize bitrate conversion with a simple gateway construction.

The packet sent out from the gateway 6 is sent out to other LANs as shown in FIG. 1. In each LAN, the received packet is decoded in a decoder connected to the LAN. The decoder may be one which is prescribed in the International Standards H. 261, and it is not described here.

According to the invention, bitrate conversion can be obtained in data communication since packetized data for transmission is selectively discarded. Since only high frequency DCT components are selectively discarded, low frequency coefficients of DCT which are important for maintaining the subjective picture quality is not discarded. Packet video bitrate conversion thus can be readily executed to prevent picture quality deterioration as much as possible.

Moreover, since the video packet includes data for choosing its passing or discarding, the choice can be readily made. The bitrate conversion thus can be realized with a simple construction. Since only high frequency DCT components are discarded while preserving motion data, it is possible to suppress picture quality deterioration as much as possible.

Figure 18:
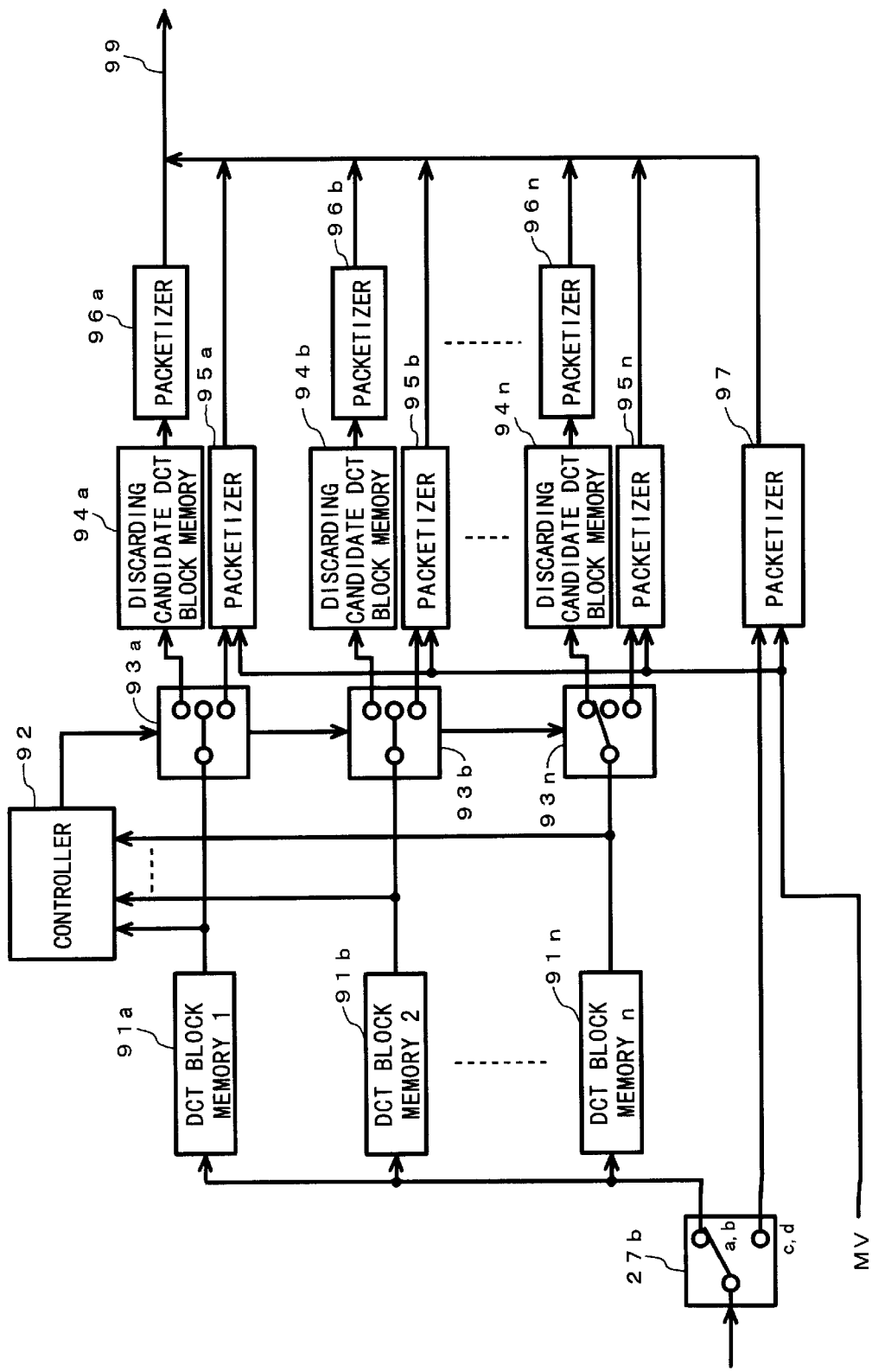
FIG. 18 is a block diagram showing a third embodiment of the invention.

A third embodiment of the invention will now be described with reference to FIG. 18. This embodiment has a feature in a circuit after the sixth switch 27b. FIG. 18 shows only this circuit. The circuit before the sixth switch 27b is the same as shown in FIG. 12, and is not described here.

Figure 19:
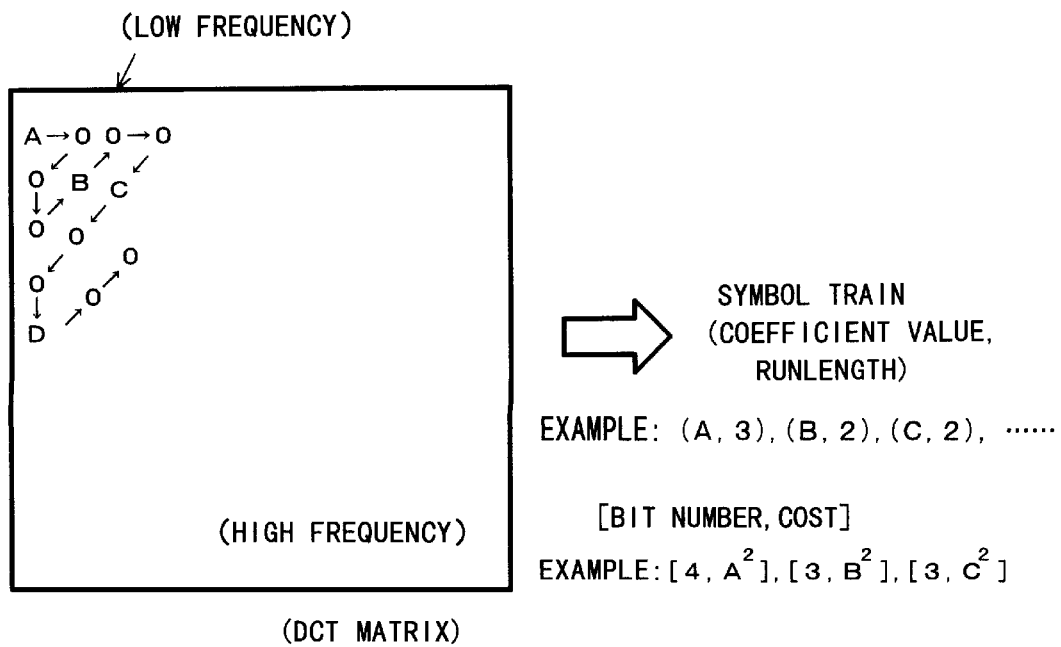
FIG. 19 is a view illustrating zig-zag scanning of a DCT matrix to obtain a symbol train and cost in this case.

The construction and operation of the third embodiment will now be described. FIG. 19 is a view for describing a symbol train obtained by zig-zag scanning a DCT matrix outputted from the sixth switch 27b shown in FIG. 18. As shown, the symbol train consists of coefficients and zero runlengths. In the illustrated example, a signal given as "(A, 3), (B, 2), . . . ," is outputted from the terminals a and b of sixth switch 27b. As described before, the symbol train is generated through the zig-zag scanning of the DCT matrix for each DCT block of 8×8 picture elements.

The symbol train obtained through the zig-zag scanning obtained with each DCT block is stored in each of DCT block memories 91a, 91b, . . . . When n DCT block symbol trains have been stored in DCT block memories 91a to 91n, a controller 92 extracts the last symbols (i.e., high frequency side symbols) in the symbol trains stored in the DCT block memories 91a to 91n. The controller 92 then compares the costs of the n symbols, and makes the least DCT block to a discarding candidate DCT block. In this embodiment, the cost of the symbol is defined to be the square of the coefficient value noted above. The number of the DCT block memories 91a to 91n may be equal to or less than the number of blocks as divisions of one video data frame by 8×8 picture elements.

Referring to FIG. 19, the controller 92 obtains sets of "bit number and cost" from a symbol train obtained through zig-zag scanning of the DCT matrix of a DCT block. For example, from a symbol train of (A, 3), (B, 2), (C, 2), . . . the controller 92 "bit number and cost" sets $(4, A^2)$, $(3, B^2)$, $(3, C^2)$, .... By the term "bit number" is meant the length of a symbol word which is preliminarily assigned to each symbol.

Referring to FIG. 18, when the cost of the last symbol in an n-th DCT block memory 91n is least, the controller 92 switches a switch 93n to the side of a discarding candidate DCT block memory 94n to transfer the last symbol thereto. As a result, the last symbol in the DCT block memory 91n is updated to the second symbol from the end. The controller 92 adds the bit number of that symbol to data in a bit number counter (not shown) provided in it.

The controller 92 then extracts again the last symbols in the symbol trains stored in the DCT block memories 91a to 91n, compares the costs of the n symbols, and makes the symbol of the least cost to be a discarding candidate DCT block. The controller 92 switches a switch corresponding to the discarding candidate DCT block and stores the last symbol in the pertinent one of the discarding candidate DCT block memories 94a to 94n. At this time, the controller 92 adds the bit number of that symbol to the data in the bit counter.

The above operation is executed repeatedly until the bit number count becomes equal to a predetermined number. Successive symbols which are each of the least cost among the last symbols in the DCT block memories 91a to 91n, are thus stored in pertinent ones of the discarding candidate DCT block memories 94a to 94n.

Figure 20:
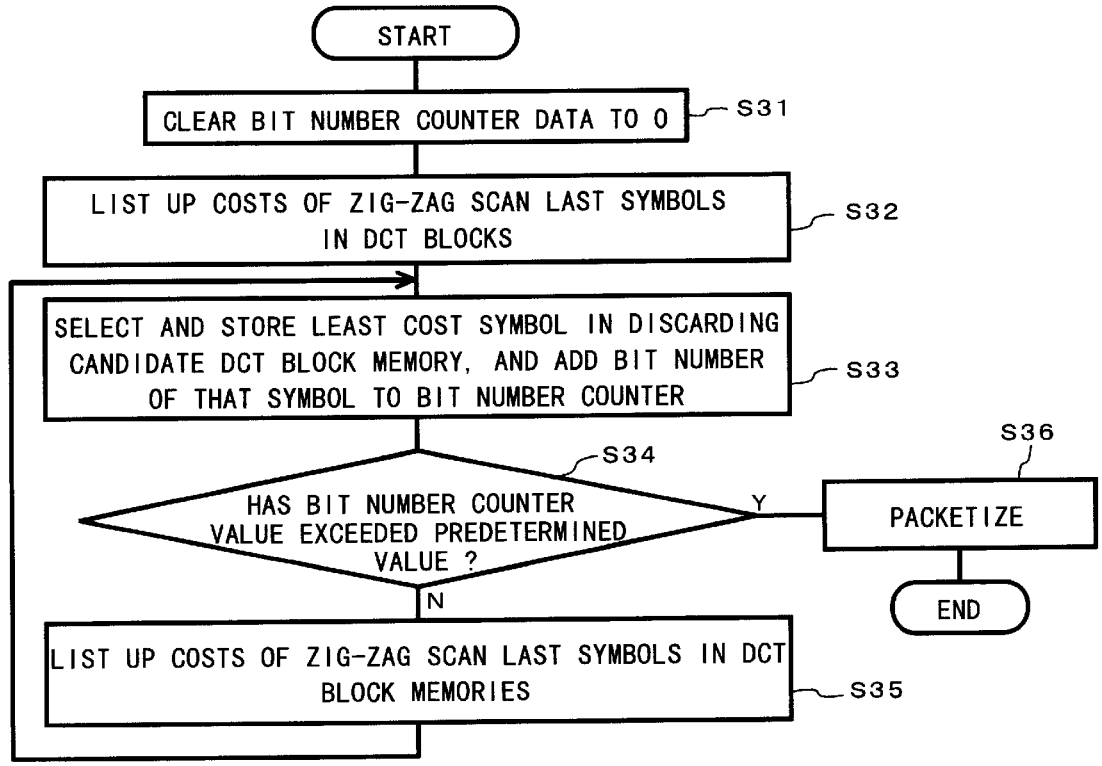
FIG. 20 is a flow chart illustrating a routine in the case of FIG. 19.

FIG. 20 is a flow chart illustrating the routine of the controller 92. In a step S31, the count data in the bit number counter is cleared to zero. In a step S32, the costs of the last symbols after the zig-zag scanning of DCT blocks are listed up. In a step S33, the least cost one of these last symbols is selected and stored in the corresponding one of the discarding candidate DCT block memories 94a to 94n, while the bit number of that symbol is added to the bit number counter data. In a step S34, a check is made as to whether the count of the bit number counter has exceeded a predetermined value. When this check step provides "NO", a step S35 is executed, in which the costs of the zig-zag scan last symbols in the DCT block memories 91a to 91n are listed up. The routine goes back to the step S33.

In the above process, first importance frequency coefficients (i.e., low frequency coefficients) in the DCT blocks having great influence on the picture quality, are left in the DCT block memories 91a to 91n, and second importance frequency coefficients (i.e., high frequency coefficients) of DCT having less influence on the picture quality are stored in the discarding candidate DCT block memories 94a to 94n.

When the check step S34 provides "YES", a step S36 is executed, in which packetizers 95a to 95n effects packetization by adding motion vector (MV) to the symbols remaining in the DCT block memories 91a to 91n. Packetizers 96a to 96n, on the other hand, packetize the discarding candidate DCT block data stored in the discarding candidate block memories 94a to 94n. A packetizer 97 packetizes the output from the terminal c, d of the sixth switch 27b and motion vector (MV).

As shown, in this embodiment the costs of zig-zag scan last symbols are listed up for a plurality of DCT blocks, and successive least cost symbols are made to be discarding candidates. It is thus possible to minimize the total cost given to the picture quality with respect to the bitrate when all the non-important packets are discarded.

FIG. 21 is a block diagram showing a fourth embodiment of the invention. In the figure, reference symbols 98a to 98n designate DCT block cost counters, while other reference numerals or symbols like those in FIG. 18 designate like parts.

Figure 22:
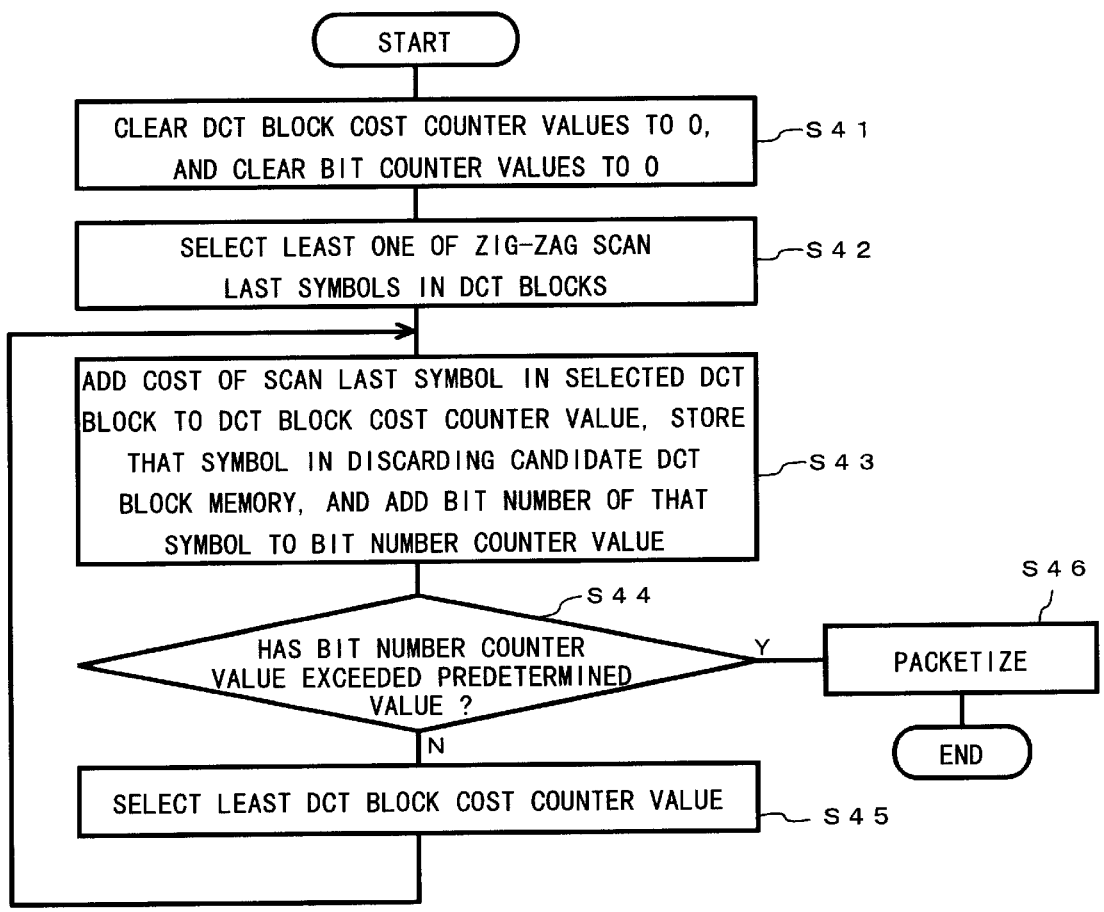
FIG. 22 is a flow chart illustrating a routine in the system shown in FIG. 21.

FIG. 22 illustrates the operation of this embodiment. In a step S41, the count data in the cost counters 98a to 98n are cleared to zero. Also, a bit number counter (not shown) in the controller 92 is cleared. In a step S42, the controller 92 select the least cost last symbols in the zig-zag scan of the DCT matrixes stored in the DCT block memories 91a to 91n. In a step S43, the controller 92 adds the cost of the zig-zag scan last symbol in a selected DCT block to the data in the corresponding counter, while that symbol is stored in the corresponding one of the discarding candidate DCT memories 94a to 94n. The bit number of that symbol is also added to the bit number counter data.

In a step S44, a check is made as to whether the count of the bit number counter has exceeded a predetermined value. When this check step provides "NO", a step S45 is executed, in which the least one of the counts of the DCT block cost counters is selected. When a plurality of least counts are present, one of them is selected, which corresponds to the least one of the zig-zag scan end coefficients stored in pertinent ones of the DCT block memories 91a to 91n. The routine then goes back to the step S43.

As a result of the above process, first importance DCT coefficients of the DCT blocks having great influence on the picture quality are left in the DCT block memories 91a to 91n, while second importance DCT coefficients having less influence on the picture quality are stored in the discarding candidate DCT block memories 94a to 94n.

When the step S44 provided "YES", the packetizers 95a to 95n execute packetization by adding motion vector (MV) to the symbols remaining in the DCT block memories 91a to 91n, while the packetizers 96a to 96n executes packetization of the discarding candidate DCT block data in the discarding candidate DCT block memories 94a to 94n. The packetizer 97 packetizes the output from the terminal c, d of the sixth switch 27b and motion vector (MV). Packetized data 99 from these packetizers are successively outputted to the LAN interface shown in FIG. 1. The packets outputted from the packetizers 95a to 95n and 96a to 96n have the same format as described before in connection with FIG. 15, which is not described here.

As shown above, in this embodiment the least one of the counts of the DCT block cost counters is selected, and the zig-zag scan end coefficient stored in the DCT block memory corresponding to the least count is made to be a discarding candidate. It is thus possible to have the costs shared by the DCT blocks to be equal when all the non-important packets are discarded.

Figure 23:
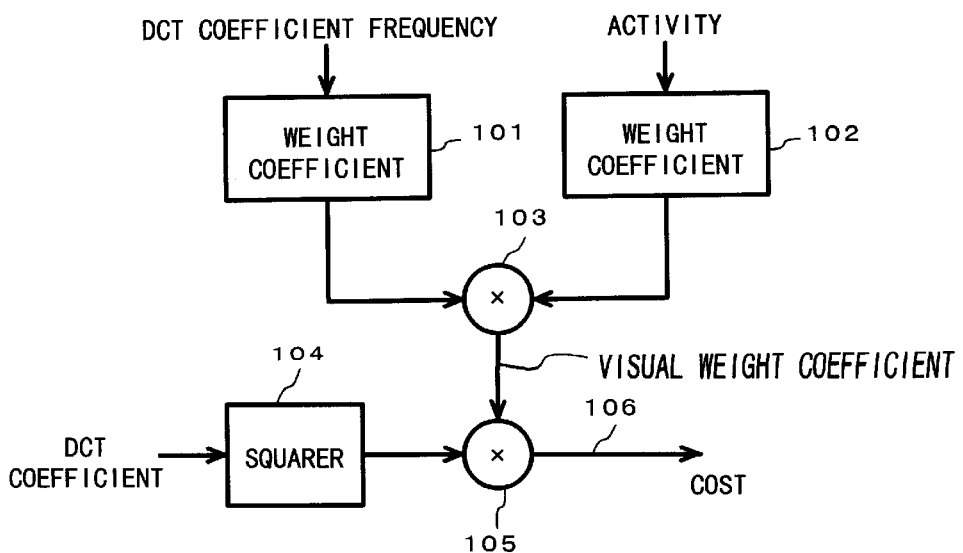
FIG. 23 is a block diagram for describing a cost deriving method.

The cost described in the above embodiments may be obtained by squaring the DCT coefficient or by multiplying the square by a visual weight. FIG. 23 is a view showing the latter method of obtaining the cost. Weight coefficients 101 and 102 are obtained from the DCT coefficient frequency and the activity representing the degree of change in brightness, respectively, and are multiplied in a multiplier 103 to obtain a visual weight coefficient. This visual weight coefficient is reduced with increase of the DCT coefficient frequency and increased with reduction thereof. It is also reduced with increase of the activity and increased with reduction thereof. The DCT coefficient is squared in a squarer 104, and the square therefrom and the visual weight coefficient from the multiplier 103 are multiplied by each other in a multiplier 105 to obtain cost 106.

As an alternative, it is possible to store the importance index in the packet header of a discarding candidate packet. In this case, importance indexes are generated from DCT coefficients stored in the discarding candidate DCT block memories 94a to 94n shown in FIGS. 18 and 21, and the supplied to the packetizers 96a to 96n. The way of obtaining the importance index is the same as in the case of FIG. 14, and not described here.

Data outputted from the packetizers 95a to 95n, 96a to 96n and 97 are inputted through the LAN interface 3, LAN 4 and LAN interface 5 to the gateway 6 shown in FIG. 1. The gateway 6 may be of the construction as shown in FIGS. 16 and 17, and not described here.

Packets from the gateway 6 are sent out to other LANs, and decoded by a decoder connected to each of the LANs receiving them.

In this embodiment, packetized data for transmission is selectively discarded, thus permitting bitrate conversion for data communication. In addition, only high frequency components of DCT are discarded, and low frequency components which are important for maintaining a subjective picture quality are not discarded. It is thus possible to obtain ready packet video bitrate conversion prevent picture quality deterioration as much as possible.

Furthermore, the least one of the counts of the DCT block cost counters is selected, and the zig-zag scan end coefficient stored in the corresponding DCT block memory is discarded, thus permitting substantially equalizing the costs shared by the DCT blocks when the non-important packets are all discarded. It is thus possible to make one frame picture quality even over the entire image.

Moreover, since the importance index or like data for judging whether a video packet is to be discarded is added to the video packet, the gateway can easily make a judgment as to whether the video packet is to be discarded. Yet further, since only DCT data is discarded while preserving motion data, it is possible to suppress picture quality deterioration as much as possible.

What is claimed is:

1. A packet video bitrate conversion system for packetizing video data and executing bitrate conversion by using the packetized data comprising:

encoding means for encoding video data and outputting coded data including mode selection data;

separating means for separating coded data of DCT blocks including DCT components into first importance components of the DCT blocks having great influence on picture quality and second importance components having less influence on the picture quality, the second importance components of the DCT blocks being related to one another, wherein the separating means separates DCT matrix coefficients of DCT blocks into first importance and second importance components by repeatedly executing a predetermined number of times a process of comparing least importance components of the individual DCT blocks and making the least one of the compared least importance components to be the second importance component;

packetizing means for independently packetizing the DCT block data separated by the separating means; and bitrate conversion means for executing bitrate conversion by selectively discarding the second importance component packets.

2. A packet video bitrate conversion system for packetizing video data and executing bitrate conversion by using the packetized data comprising:

encoding means for encoding video data and outputting coded data including mode selection data;

separating means for separating coded data of DCT blocks including DCT components into first importance components of the DCT blocks having great influence on picture quality and second importance components having less influence on the picture quality, the second importance components of the DCT blocks being related to one another, wherein the separating means separates DCT matrix coefficients of DCT blocks into first importance and second importance components of the individual DCT components such that the second importance components of the DCT blocks are averaged;

packetizing means for independently packetizing the DCT block data separated by the separating means; and bitrate conversion means for executing bitrate conversion by selectively discarding the second importance component packets.

3. A packet video bitrate conversion system for packetizing video data and executing bitrate conversion by using the packetized data comprising:

encoding means for encoding video data and outputting coded data including mode selection data;

separating means for separating coded data of DCT blocks including DCT components into first importance components of the DCT blocks having great influence on picture quality and second importance components having less influence on the picture quality, the second importance components of the DCT blocks being related to one another, wherein the separating means includes second importance component accumulating means for accumulating the second importance components of the DCT blocks, least importance components of DCT blocks of successively greater counts of the second importance components accumulating means being successively made to be second importance components;

packetizing means for independently packetizing the DCT block data separated by the separating means; and bitrate conversion means for executing bitrate conversion by selectively discarding the second importance component.

* * * * *